Oct. 7, 1952  R. H. BEADLE  2,612,773
TORSIONAL VIBRATION PICKUP
Filed Jan. 7, 1950  3 Sheets-Sheet 1

INVENTOR
ROBERT H. BEADLE
BY
ATTORNEY

Oct. 7, 1952        R. H. BEADLE        2,612,773

TORSIONAL VIBRATION PICKUP

Filed Jan. 7, 1950        3 Sheets-Sheet 2

INVENTOR
ROBERT H. BEADLE

BY
ATTORNEY

Oct. 7, 1952     R. H. BEADLE     2,612,773
TORSIONAL VIBRATION PICKUP

Filed Jan. 7, 1950     3 Sheets-Sheet 3

INVENTOR
ROBERT H. BEADLE
BY
ATTORNEY

Patented Oct. 7, 1952

2,612,773

UNITED STATES PATENT OFFICE 2,612,773

TORSIONAL VIBRATION PICKUP

Robert H. Beadle, Beloit, Wis., assignor to Fairbanks, Morse & Co., Chicago, Ill., a corporation of Illinois Application January 7, 1950, Serial No. 137,348

7 Claims. (Cl. 73—68)

This invention relates to improvements in torsional vibration pickups and more particularly to an improved pickup device for attachment to an end of a rotating element or shaft, adapted to actuate a suitable indicating or recording means in accordance with the frequency and amplitude of torsional vibrations occurring in the rotating element or shaft.

The invention resides in an electrical pickup device of an improved and simplified character, wherein torsional vibrations in a rotating element or shaft under test, produce angular displacements to a proportional degree, in the opposed plates of a variable condenser. The condenser is connected in an electrical circuit and functions to modulate a high frequency carrier wave. The modulated wave is projected on the screen of a cathode ray oscillograph, and an analysis of its form enables an accurate determination of the amplitude and frequency of torsional vibrations in the shaft. The invention is directed in particular, to the constructional features of the improved pickup device as hereinafter described and claimed.

A presently preferred embodiment of the pickup device is illustrated in the accompanying drawing wherein.

Figures 1, 11:
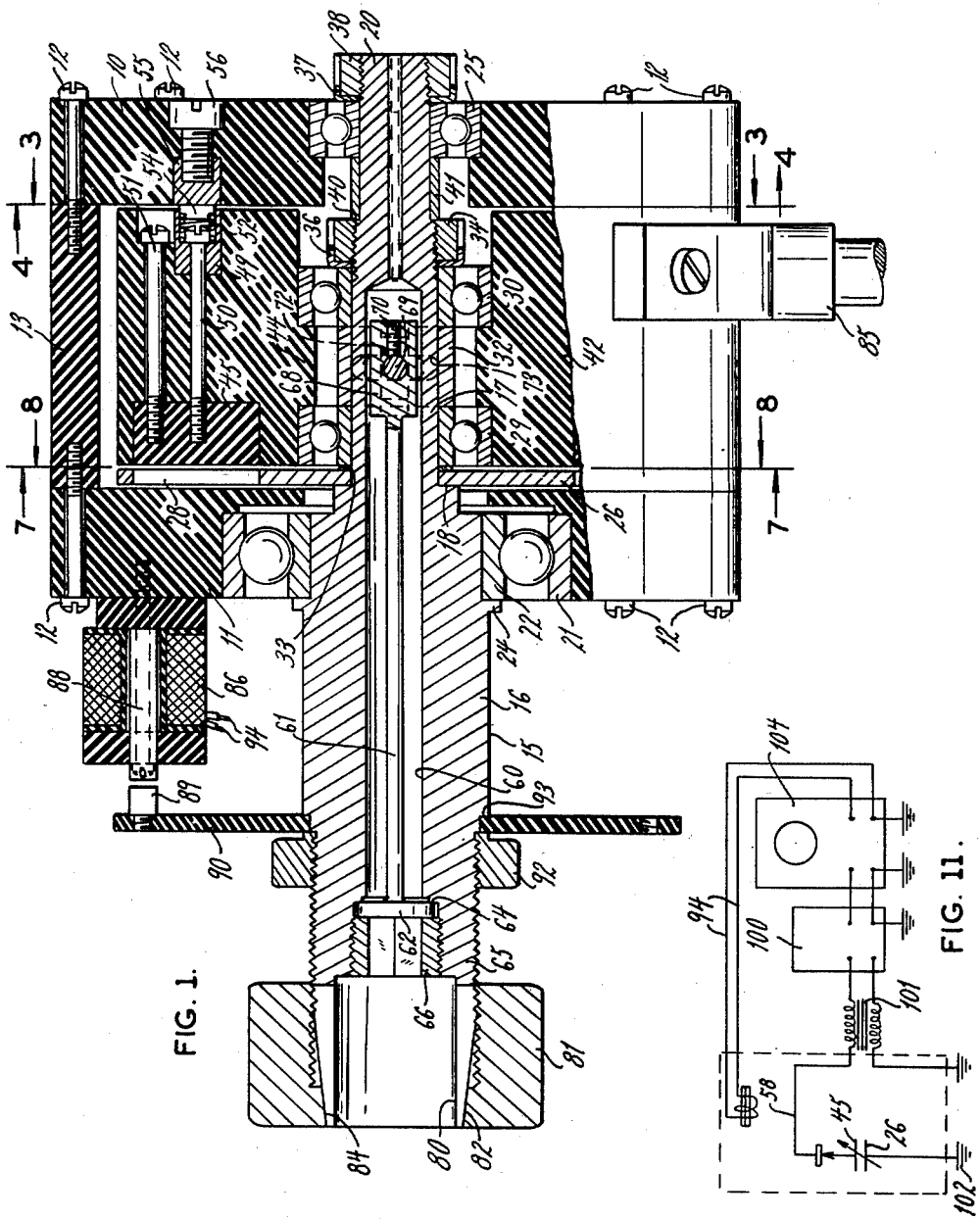
Fig. 1 is a longitudinal sectional view of the pickup device.
Fig. 11 illustrates diagrammatically, the circuit relation of the pickup device to a high frequency carrier wave generator and an oscillograph.
Figure 3:
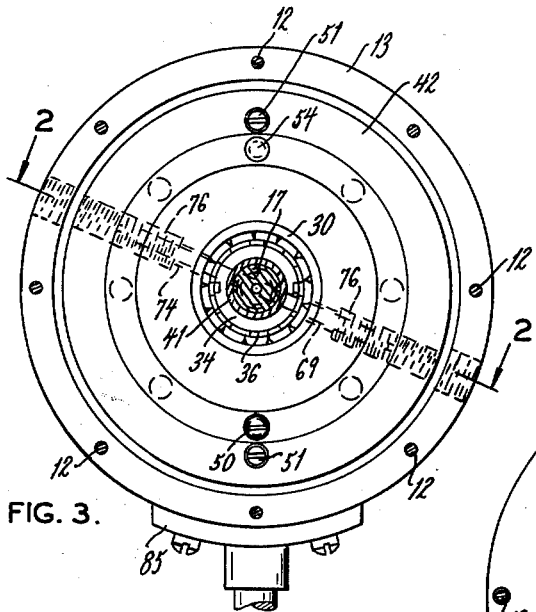
Fig. 3 is a transverse elevation partly in section, as viewed from line 3—3 in Fig. 1.
Figure 6:
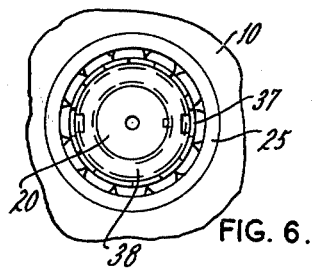
Fig. 6 is a fragmentary end view as taken from line 6—6 in Fig. 2.
Figure 4:
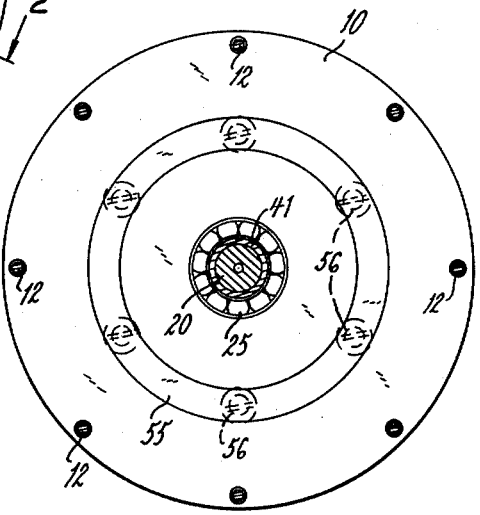
Fig. 4 is a transverse view opposite to that of Fig. 3, as taken along line 4—4 in Fig. 1.
Figure 8:
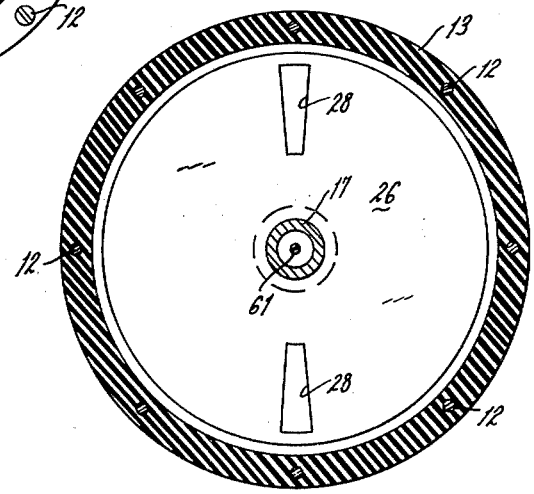
Fig. 8 is a transverse view opposite to that of Fig. 7, as taken along line 8—8 in Fig. 1.

With reference to the drawing, and particularly to Fig. 1, there is provided a hollow cylindrical housing structure consisting of two circular end plates 10 and 11 secured as by screws 12, to the opposite ends of an annular housing member 13, the member and the end plates being formed of suitable insulating material such as fiber. Extending axially through the housing is a hollow shaft 15 of stepped form, providing a central large diameter section 16, a section 17 of lesser diameter defining a shoulder 18 for a purpose to appear, and a small diameter end section 20. The shaft is rotatably supported by an anti-friction bearing 21 in the housing plate 11, engaging the large diameter section 16 of the shaft, with the inner bearing race 22 abutting a shaft shoulder or flange 24, and by anti-friction bearing 25 in housing plate 10, engaging the small end 20 of the shaft. Carried on shaft section 17 within the housing, is a metallic disc 26 arranged in abutment with shaft shoulder 18, the disc forming one plate of a condenser and being formed with diametrically opposite cut-outs or openings 28 of the configurations substantially as shown in Fig. 8. On shaft section 17 are anti-friction bearings 29 and 30 spaced apart by a sleeve 32, the bearing 29 being spaced from the condenser disc 26 as by a suitable spacing washer 33. The bearings 29 and 30 are retained by a collar 34 threaded on the shaft and held by a lock washer 36, the collar 34 when drawn up, serving to effect through the inner races of the bearings, the sleeve 32 and the spacing washer 33, a rigid clamping of the condenser disc against the shaft shoulder 18 so that the disc will rotate with the shaft. Threaded on the small end of the shaft in abutment with bearing 25 through a lock washer 37, is a clamp nut or collar 38, and between the bearing and the shaft shoulder 40 is a spacing sleeve 41. Thus when the nut 38 is drawn up, the shaft will be held against axial play, by the shaft shoulder 24 abutting the inner race of bearing 21, and by the sleeve 41 and nut 38 in engagement with the inner race of the bearing 25.

Figure 7:
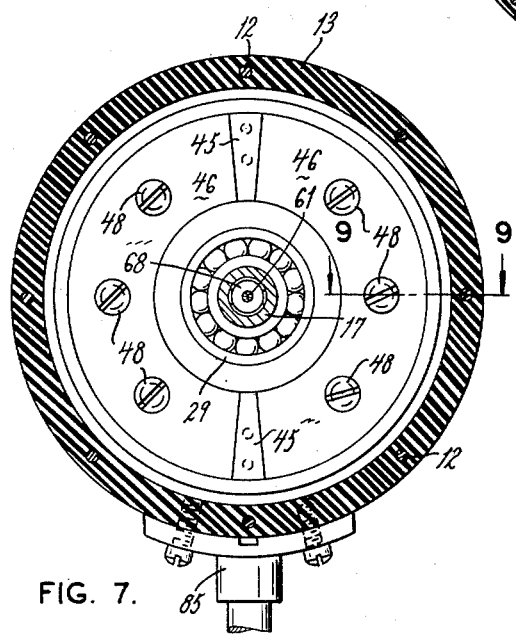
Fig. 7 is a view transversely through the device, as taken along line 7—7 in Fig. 1.

Disposed within the housing is an inertia mass 42 in the form of an annular block of insulating material, the mass being mounted on the shaft-carried bearings 29 and 30 so that it may oscillate freely relative to shaft 15, as will appear. The mass is retained in proper position axially of the housing, as by a spacing shoulder 44 integral with the block and in abutment with the outer races of the bearing 29 and 30. Recessed in one end face of the block are diametrically opposite metallic elements 45 (Fig. 7) each of a wedge shape as shown, having the exposed faces thereof opposed to the condenser disc 26, the disc and the elements 45 forming the variable condenser of the present unit. The elements 45 are laterally supported by a pair of arcuate members 46 of insulating material, similarly recessed in the end face of the block and retained by screws 48 (Figs. 7 and 8) extending longitudinally through the block and threading into an annular conductor ring 49 recessed in the opposite end face of the block. Each element 45 is clamped to the block by a pair of screws 50 and 51, the screw 50 engaging the ring 49 with its head in a ring recess 52. Thus the ring 49 through the screws 50 engaging the same and the elements 45, electrically interconnect the condenser elements 45. Mounted in one or both of the ring recesses 52 is a spring-loaded contactor element or brush 54, for wiping engagement with an annular metallic ring 55 in the inner face of the housing end plate 10. Ring 55 is clamped to the plate by suitable screws 56, one of which is adapted as a terminal element for a circuit lead 58 in the wiring diagram of Fig. 11.

Figure 5:
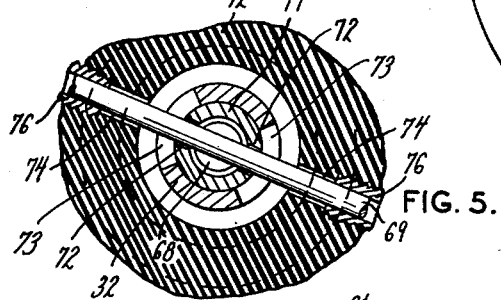
Fig. 5 is a fragmentary transverse section taken along line 5—5 in Fig. 2.
Figure 2:
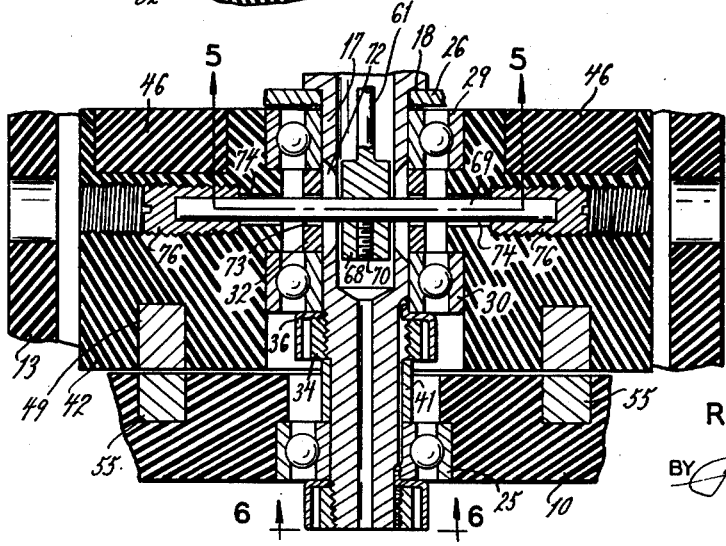
Fig. 2 is a fragmentary longitudinal section as taken along line 2—2 in Fig. 3.

Drive of the inertia mass 42 is here accomplished in a novel and highly effective manner to attain the purpose of the present unit. Extended axially in the bore 60 of shaft 15 is a torsion spring in the form of a relatively slender torque rod 61, the rod having a head 62 abutting an internal shaft shoulder 64 near the outer end 65 of the shaft, and clamped to the shoulder by a threaded plug 66 which secures the rod for rotation with the shaft. At its inner end the rod is provided with an enlargement 68 having a diametral bore through which extends a connecting pin or rod 69 (Fig. 2), the pin being secured to the rod enlargement as by an axial set screw 70. Pin 69 projects at each side of rod enlargement 68, radially through a slot 72 in shaft 15 and slot 73 in sleeve 32, the slots being of sufficient annular extent (Fig. 5) to permit of appreciable angular movement of the pin without interference by the shaft and sleeve. The ends of the pin 69 project into aligned radial bores 74 formed in the inertia body 42, and are fastened to the body by means of threaded plugs 76 as shown in Fig. 2.

Figure 10:
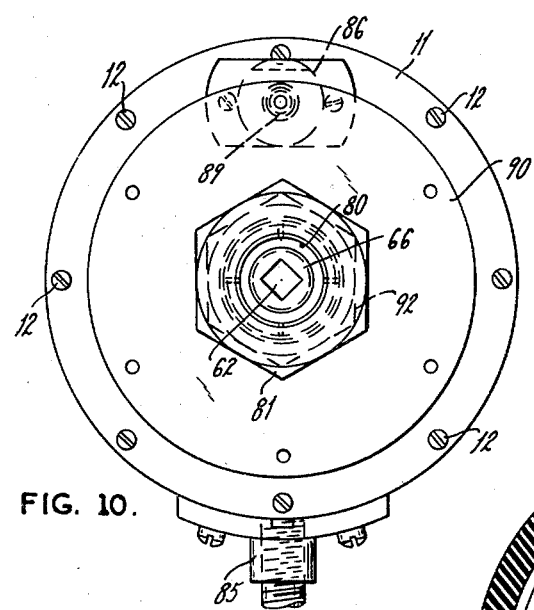
Fig. 10 is an end view of the device, taken at the left hand end in Fig. 1.
Figure 9:
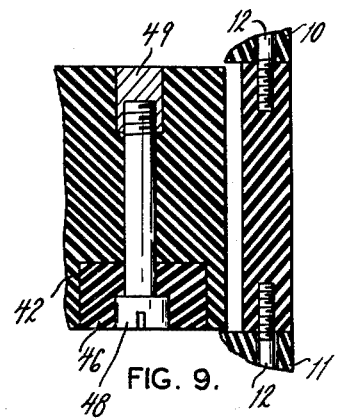
Fig. 9 is a fragmentary section as viewed along line 9—9 in Fig. 7.

The end 65 of shaft 15 is here adapted for driven connection with a test shaft (not shown) as a crankshaft to be tested for torsional vibrations. As indicated in Figs. 1 and 10, the shaft end is longitudinally split to render it contractible on the end of a test shaft which is received in the bore 80 of shaft 15, contraction of the shaft end into clamping engagement with the test shaft being effected as by a nut 81 threaded onto the shaft end 65 and having a tapered portion 82 bearing against the tapered terminal portion 84 of shaft end 65. In application of the unit to a test shaft, the housing is arranged and mounted in fixed position through a suitable bracket 85, such that the shaft 15 thereof is in exact alignment with the test shaft to which it is coupled in the manner above described.

The presently described pickup unit is intended for use with a cathode ray oscillograph, and in order to control the sweep circuit of the oscillograph such as to effect a full sweep across the oscillograph screen in each revolution of the shaft under test, the unit as now provided, embodies sweep circuit control means of relatively simple character, shown in Fig. 1. Mounted on the housing end plate 11 is a coil 86 having a permanent magnet core 88, one end of the core being exposed for cooperation with an iron pole piece 89 carried on a disc 90 of insulating material. The disc 90 is secured for rotation with shaft 15 by a clamping nut 92 clamping the disc against a shoulder 93 on the shaft. In each revolution of shaft 15, the pole piece 89 sweeps across the magnet core 88 producing an electrical impulse in the coil 86. The coil 86 is connected to the oscillograph by suitable conductors 94 shown in the schematic circuit relation of the apparatus appearing in Fig. 11, and effects a synchronizing of the tracer on the oscillograph screen, with the rotation of shaft 15 of the pickup unit.

It will appear now in respect to the pickup unit as described and illustrated, that the shaft 15 rigidly coupled to the shaft under test, follows accurately the rotational and oscillatory or torsional vibratory movements of the test shaft. Such movements are transmitted to and reflected in the condenser plate or disc 26 rigid on shaft 15. The inertia body 42 carrying the complementary condenser elements 45 and driven from shaft 15 through the torsion rod 61 and pin connection 69, is rotated at the average speed of the test shaft and remains unaffected by torsional vibrations of the latter. Accordingly with the disc 26 and inertia body 42 related in the static condition of the pickup such that the cut-outs 28 of the disc 26 are substantially opposed to the condenser elements 45 on body 42, the occurrence of torsional vibration in the shaft under test coupled to the pickup, will result in relative angular shift of the condenser parts such that the cut-outs 28 are moved from alignment with elements 45, whereby the capacity of the condenser is correspondingly changed. Therefore, as the torsional vibrations of the test shaft increase or decrease, the capacity of the condenser is increased or decreased correspondingly. Consequently, the frequency and extent of change in capacity of the condenser reflects the frequency and magnitude of the torsional vibrations in the test shaft.

Referring to Fig. 11, the present pickup unit is coupled to means 100 of well known type, for producing a desired carrier wave. The circuit is through a modulating transformer 101, lead 58 to condenser terminal 56 (Fig. 1) connected to the condenser elements 45, and the ground connection 102 from the condenser disc 26, the latter being grounded through the shaft 15. The carrier wave modulated by the action of the pickup condenser, is transmitted through the device 100 to a cathode ray oscillograph 104, where it appears on the screen of the latter, giving a visual indication of the frequency and amplitudes of the torsional vibrations occurring in the test shaft.

Having described and illustrated a presently preferred form of pickup device for the purpose indicated, what I desire to claim and secure by Letters Patent is:

1. A pickup device for the purpose described, comprising concentrically related driven and inertia members, the inertia member being rotatably carried externally on the driven member and the driven member providing a bore axially therein, means for driving said inertia member from the driven member, including a relatively slender elongate torque rod extending axially in the bore of the driven member and secured at one end to the member, and means connecting the opposite end of said rod to the inertia member, said driving means permitting limited relative angular displacements of said members, and elements carried by said members cooperating to form a variable condenser, the capacitance of said condenser varying proportionately to the extent of relative angular displacements of said members.

2. A pickup device for use with electrical apparatus to provide visual indication of torsional vibrations occurring in a rotating element under test, the device comprising a casing, a hollow shaft rotatable in the casing and adapted at one end thereof for driven connection with a rotating element under test, an inertia body and bearings journalling the body externally on said shaft, drive means for said inertia body including a relatively slender elongate torque rod extending longitudinally in the hollow shaft and operatively connected at one end to said body, means securing the opposite end of said rod to the said one end of said hollow shaft, and cooperating metallic elements on the shaft and inertia body forming a variable capacitance.

3. A pickup device for use with electrical apparatus to provide visual indication of torsional vibrations occurring in a rotating element under test, the device comprising a casing, a hollow shaft rotatable in the casing and having an end portion projecting from the casing, coupling means on the projecting portion of the shaft for connection of the shaft in driven relation to a rotating element under test, an inertia body and bearings journalling the body externally on said shaft within the casing, drive means for said inertia body including an elongate torque rod extending longitudinally in the hollow shaft, means securing one end of said rod to said shaft in a zone thereof adjacent said coupling means, a pin extending from the opposite end of said rod to connection with said body, and cooperating metallic elements on said shaft and inertia body forming a variable capacitance.

4. A pickup device for the purpose described, comprising a casing, a hollow shaft rotatably supported in the casing, an inertia body positioned coaxially with the shaft in the casing, anti-friction bearing means rotatably supporting the inertia body on the shaft, drive means for said inertia body including a relatively slender elongate torque rod extending axially in said hollow shaft, means securing one end of said rod to the shaft adjacent one end of the latter, and a pin extending from the opposite end of said rod to connection with the inertia body, said drive means permitting limited relative angular displacements of the shaft and inertia body, a metallic disc in the casing and fixed to said shaft for rotation therewith, and metallic means on the inertia body cooperating with said disc to form a variable capacitance.

5. A pickup device for the purpose described, comprising a casing, a hollow shaft rotatably supported in the casing, an inertia body of insulating material provided in the form of an annulus and arranged in the casing in a position coaxially with the shaft, anti-friction bearing means rotatably supporting the inertia body on the shaft, drive means for the inertia body including a torque rod located axially in the hollow shaft, means securing one end of the rod to the shaft, said shaft in a portion thereof underlying the inertia body, having an arcuate slot through the shaft wall, and a pin element connected to the opposite end of said torque rod and extending laterally therefrom through said shaft slot to connection with the inertia body, said drive means permitting limited relative angular displacements of the shaft and inertia body, a metallic disc arranged relatively closely adjacent the inertia body in the casing and mounted on said shaft for rotation therewith, and metallic means recessed in said inertia body in position for cooperation with said disc to form a variable capacitance.

6. A pickup device for the purpose described, comprising a hollow driven shaft, an inertia member formed by an annular body of insulating material, anti-friction bearings rotatably mounting said inertia member on the driven shaft, means for driving the inertia member from said shaft, including a relatively slender rod arranged axially in the hollow driven shaft and secured at one end to the shaft, said rod providing a bore transversely through the opposite end thereof, the driven shaft having diametrically opposite arcuate slots through the shaft wall in the portion thereof underlying the inertia member, a pin extended through said rod bore and shaft slots, and means securing the ends of said pin to the inertia member, said drive means permitting limited relative angular displacements of the driven shaft and inertia member, a metallic element recessed in said inertia member, and a metallic disc rotatable with said driven shaft, cooperating with said metallic element to form a variable condenser the capacitance of which varies proportionally to the extent of relative angular displacements of the driven shaft and inertia member.

7. In a torsional vibration indicator system, a pickup device for use with electrical apparatus including a carrier wave generator and an oscillograph in circuit therewith for providing visual indication of the frequency and amplitude of the torsional vibrations occurring in a rotating element under test, the device comprising a casing, a shaft rotatably supported in the casing and extending therefrom for driven connection with a rotating element under test, an inertia member in the casing rotatably supported on said shaft, drive means for the inertia member provided by a torque rod connected between the member and said shaft, said drive means permitting relative angular displacements of the shaft and inertia member, metallic elements on the shaft and inertia member cooperating to form a variable condenser, the capacitance of which varies proportionately to the extent of relative angular displacements of the inertia member and shaft, circuit means including said condenser elements connected to the carrier wave generator for controlling the operation of the latter, and means for synchronizing the operation of the oscillograph with the rotation of the element under test, comprising a magnet core supported by the casing, a coil winding on said core, an insulating member rotatable with said shaft, a pole piece carried by said insulating member for cooperation with said magnet core, and circuit means connecting said coil winding to the oscillograph.

ROBERT H. BEADLE.

REFERENCES CITED

The following references are of record in the file of this patent:

UNITED STATES PATENTS

| Number | Name | Date |
| --- | --- | --- |
| 1,571,349 | Summers | Feb. 2, 1926 |
| 2,469,417 | Stein | May 10, 1949 |

FOREIGN PATENTS

| Number | Country | Date |
| --- | --- | --- |
| 892,358 | France | Jan. 7, 1944 |